United States Patent
Schindler et al.

(10) Patent No.: US 9,731,644 B2
(45) Date of Patent: Aug. 15, 2017

(54) LIGHT MODULE FOR A MOTOR VEHICLE

(71) Applicants: Mirko Schindler, Velbert (DE); Peter Van Gastel, Solingen (DE)

(72) Inventors: Mirko Schindler, Velbert (DE); Peter Van Gastel, Solingen (DE)

(73) Assignee: Huf Huelsbeck & Fuerst GmbH & Co. KG, Velbert (DE)

( * ) Notice: Subject to any disclaimer, the term of this patent is extended or adjusted under 35 U.S.C. 154(b) by 0 days.

(21) Appl. No.: 14/947,629

(22) Filed: Nov. 20, 2015

(65) Prior Publication Data

US 2016/0159270 A1 Jun. 9, 2016

(30) Foreign Application Priority Data

Dec. 9, 2014 (DE) .......... 10 2014 118 232

(51) Int. Cl.
*B60Q 1/00* (2006.01)
*B60Q 1/30* (2006.01)
*F21S 8/10* (2006.01)

(52) U.S. Cl.
CPC ......... *B60Q 1/0023* (2013.01); *B60Q 1/0064* (2013.01); *B60Q 1/30* (2013.01); *F21S 48/211* (2013.01); *F21S 48/214* (2013.01); *B60Q 2900/10* (2013.01)

(58) Field of Classification Search
CPC ...... B60Q 1/0023; B60Q 1/0064; B60Q 1/30; F21S 48/211; F21S 48/214
See application file for complete search history.

(56) References Cited

U.S. PATENT DOCUMENTS

| 7,068,159 B2 * | 6/2006 | Ko | B60Q 1/0023 340/435 |
| 2003/0174053 A1 * | 9/2003 | Rennick | B60Q 1/0023 340/435 |
| 2004/0201463 A1 * | 10/2004 | Ko | B60Q 1/0023 340/435 |

FOREIGN PATENT DOCUMENTS

DE 203 11 415 U1 10/2003

* cited by examiner

*Primary Examiner* — Anabel Ton
(74) *Attorney, Agent, or Firm* — Fay Sharpe LLP

(57) ABSTRACT

A rear light module for a motor vehicle includes a housing, which has a connecting side facing toward the interior of the motor vehicle and an emission side facing toward the exterior of the motor vehicle. The housing includes multiple mountings at the connecting side, which are designed for implementing and mechanically supporting lamps mounted on sockets. The lamps with their sockets are arranged, respectively, in one of the mountings for forming a connection from the connecting side and extending into the housing. Besides the mountings for the lamps, at least one further mounting is designed, in which is selectively insertable a removable proximity sensor mounted on a socket, so that the proximity sensor can be connected from the connecting side, extends into the housing and detects when a user approaches the emission side.

12 Claims, 2 Drawing Sheets

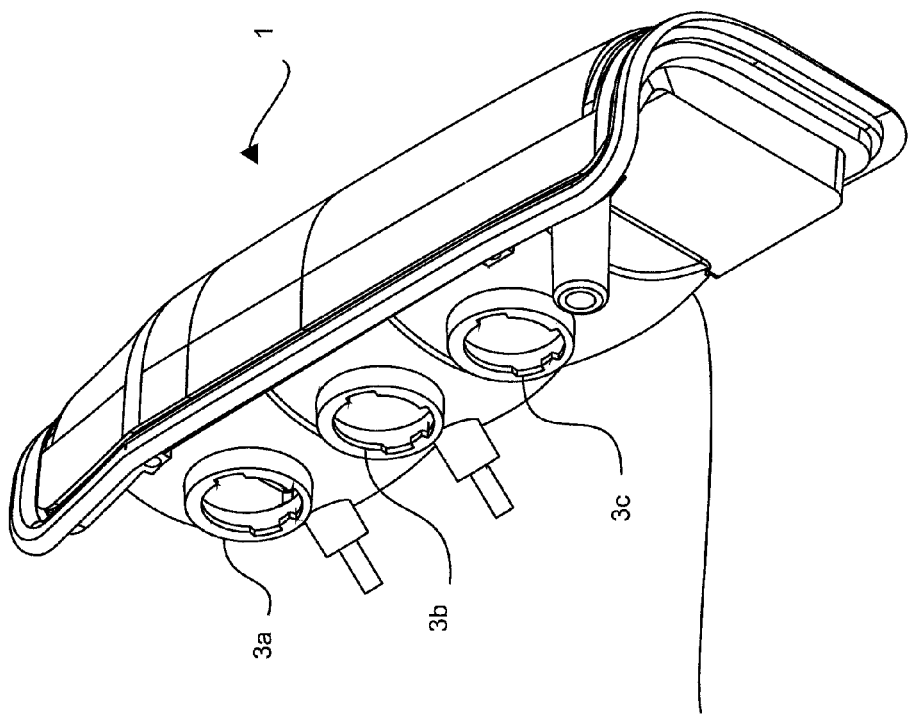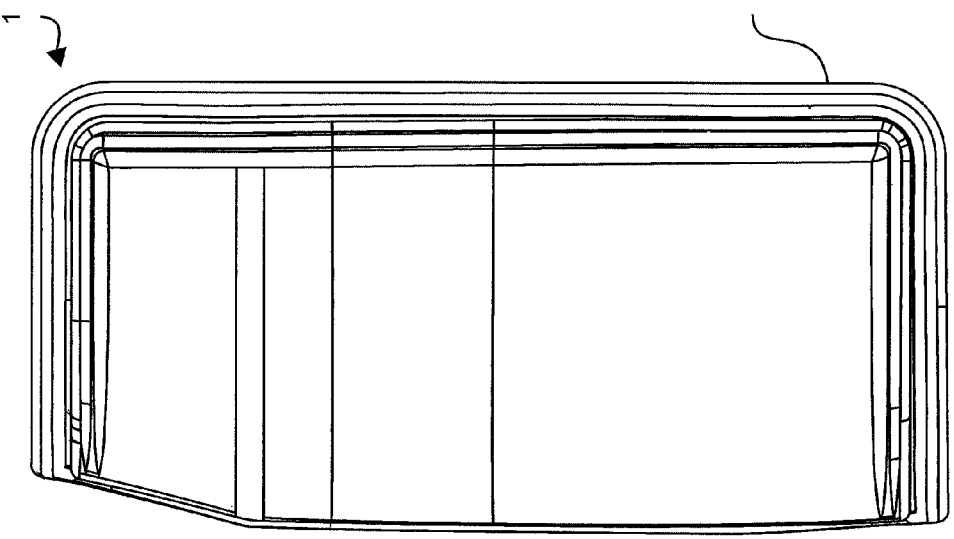

LIGHT MODULE FOR A MOTOR VEHICLE

BACKGROUND

The invention relates to a rear light module for a motor vehicle. In particular, the invention relates to a rear light module with a housing, which has a connecting side facing toward the interior of the motor vehicle and an emission side facing toward the exterior of the motor vehicle. The housing comprises multiple mountings at the connecting side, which are designed for implementing and mechanically supporting lamps mounted on sockets, so that the lamps with their sockets are arranged in respective mountings for forming a connection from the connecting side, extending into the housing and during periods of operation emitting their light through the emission side.

Rear light modules are arranged mostly at prominent places at the rear end of the body of the motor vehicle. The optical signals of the rear light modules are important for the following traffic with regard to information involving the driving status of the motor vehicle. However, some rear lights also have sensor functions in addition to the signal function.

For example, DE 203 11 415 describes a rear light device with built-in safety sensors, which are used as parking sensors. In this way, the region of space of the rear lights is available in a favorable manner for the use of sensor elements.

Such rear light modules have the disadvantage that they have to be assembled at the factory and mounted in the vehicle. The maintenance and replacement of parts is time-consuming and expensive.

It is the objective of the invention to provide an improved rear light module with built-in sensors.

BRIEF SUMMARY

This objective is achieved by means of a rear light module which has the characteristics of claim 1.

Besides the characteristics mentioned at the outset, and besides the mountings for the lamps with their sockets, the invention-based rear light module has at least one additional mounting at the connecting side. In this mounting, a removable proximity sensor mounted on a socket is inserted. The proximity sensor is inserted into the mounting of the rear light module from the connecting side and protrudes with its contact area for forming a connection with a wiring harness of the motor vehicle from the rear light module. On the interior side of the rear light module, the proximity sensor extends into the housing, always protected by the housing, especially the emission surfaces of the rear light module.

Therefore, the proximity sensor is inserted or screwed or fixed in any other way in a mounting in a manner similar to inserting the lighting devices and can thus be easily accessed, replaced or removed at any time. This has the advantage that vehicles can be initially delivered from the factory without having a proximity sensor installed in the rear light and easily be retrofitted with this function by a retailer or in a workshop.

Even in production this particular design has quite a few advantages because, besides the mountings and connectors for the lighting devices, it is possible to build additional mountings for the proximity sensor. For example, these mountings can be formed with the same tool formation used for producing the lamp mountings. For example, if the mounting for the proximity sensor is not required, a blind plug is inserted in the respective opening.

The proximity sensor protrudes into the interior of the rear light module and is there protected by the surrounding housing against mechanical pressures from the outside. The sensing process takes place without any problems by way of the plastic emission surface facing to the outside.

On the side of the motor vehicle, the proximity sensor can be coupled with a control system in the motor vehicle, in order to sense approaches to the vehicle or operator events. For example, an operation can provide that the trunk lid is opened when the hand of the operator approaches the rear light provided with a proximity sensor.

Preferably, proximity sensors can comprise optical or capacitive sensors. Both types of sensors are often used in automobile construction. In particular, capacitive sensors are often used in motor vehicle door handles or even for operating trunk lids. Such sensor devices and circuits and technical documentation are available on the market.

For example, optical sensors to be used can involve infrared sensors, but it is also possible to use more complex sensors, for example, time-of-flight sensors.

The fact that the mounting for the proximity sensor is easily accessible from the interior of the motor vehicle is of great advantage. In contrast to modules with firmly attached sensors, the use and even the production is considerably more flexible, especially because it is possible to use available tools and fixing mechanisms for the socket support.

In a further embodiment of the invention, it is provided that a capacitive proximity sensor is used, which has in addition to the electronics a conductor loop coupled with the electronics. Capacitive sensors work in such a way that a conductor loop is repeatedly reloaded via a charging connection, in order to detect capacity changes by means of different charge flows. In the simplest case, the capacitive sensor includes a rigid wire, which is set in a loop and extends into the interior of the rear light. Alternatively, a conductor loop can be imbedded in a plastic film or glued onto it and extends with the film or carrier into the rear light.

In a preferred embodiment of the invention, the socket of the proximity sensor is with regard to its coupling components designed and formed similar to at least one of the sockets of the lamps, so that the mountings are designed and formed similar to at least one of the lamps and the socket of the proximity sensor.

In this preferred embodiment, the mechanical mountings and recesses in the rear light modules at the connecting side for at least one of the lamps and the proximity sensor do not differ. As a result, mechanically similar coupling elements are used for the rear light module and the lamps and proximity sensor, in order to install the lamps and the proximity sensor in the rear light. Especially with regard to production, it is easy when available forms and designs are used for openings and couplings. Moreover, it is then also possible to use uniform connection components, for example, sealing rings or other components.

BRIEF DESCRIPTION OF THE DRAWINGS

The invention is now described in more detail by means of the enclosed drawing.

FIG. 1a shows a view on an emission side of a rear light module;

FIG. 1b shows an oblique view on the connecting side of the rear light module shown in FIG. 1a;

DETAILED DESCRIPTION

FIG. 1a shows the rear view on the emission side of a rear light module 1. The visible surface consists of a transparent plastic material, through which light is emitted through the rear light in the direction of the following traffic. The outer limits of the rear light module are formed by a housing 2. The housing 2 can comprise multiple parts. In particular, the rear emission side can consist of a transparent plastic material, and the housing sides pointing to the inside consist of a strong, opaque plastic material.

The rear light module shown in FIG. 1a is shown in FIG. 1b from a different perspective. This view shows the connecting side of the housing 2. The connecting side has three mountings 3a, 3b, 3. The mountings provide a feed-through opening for lamps and this embodiment provides a feed-through opening in the center for the sensor arrangement.

In the mountings mechanical coupling means are designed, for example, in the form of bayonet fittings. In addition, the rear light module has connectors for mounting the rear light module to the body of the motor vehicle. However, these are not of significance for the invention.

Figure 2:
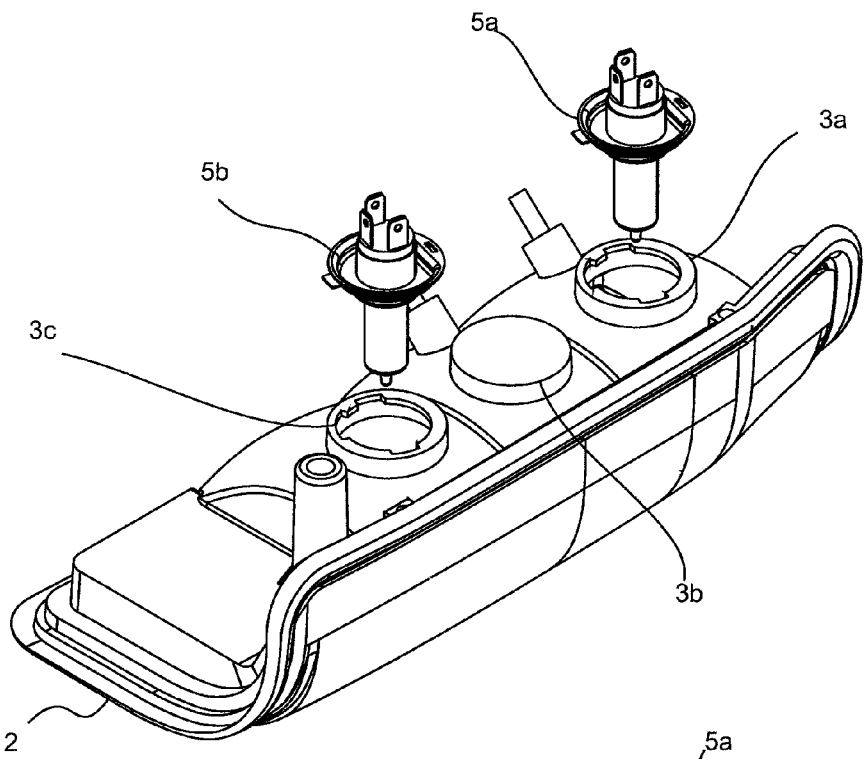
FIG. 2 shows the rear light module with two assigned lamps mounted on sockets.

FIG. 2 shows the use of the embodiment shown in FIGS. 1a and 1b with lamps held in sockets 5a and 5b. The lamps in their sockets 5a and 5b are inserted in the openings 3a and 3c and fixed in position. For this purpose, the sockets have adjusted connectors, which engage in the mechanical coupling means 3a and 3c.

In this view, the mounting 3b is closed by a blind plug 4. In this embodiment, the rear light merely has the purpose of providing an optical signal. However, it has no sensor for detecting any approaches.

Figure 3:
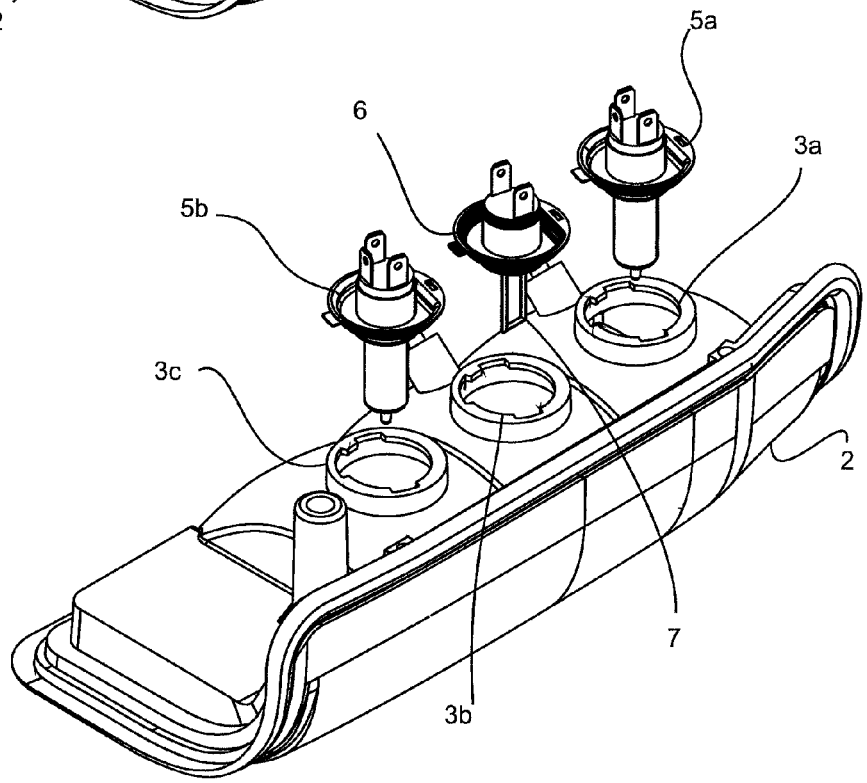
FIG. 3 shows the rear light module with two assigned lamps mounted on sockets and a sensor device mounted on a socket.

FIG. 3 shows the embodiment in the invention-based form, wherein the blind plug 4 is removed and a capacitive proximity sensor 6 has to be inserted in the mounting 3b. The capacitive proximity sensor 6 is formed by the socket, which is adjusted to the mounting 3b. In the socket, an electronic circuit has been designed for controlling a loop-shaped sensor electrode 7. When the sensor 6 is inserted in the mounting 3b, the electrode protrudes into the protected interior of the housing and senses when a user approaches the lamps.

Regarding the design of a control circuit for the sensor electrode 7, reference is made to the appropriate prior art, in which the respective charging and evaluation circuits are described. Furthermore, such circuits are available in the market.

On its exterior side, the socket, or connecting side, is provided with a connection fitting which differs from that of the lighting equipment. This prevents the connection of the lamps from being confused with the sensor electronics. It is obvious that the mountings 3a, 3b and 3c are designed in the same manner, making it particularly easy to design and produce such rear light modules. In addition, it is possible to use socket components for the sensors 6 which are already used for the lighting equipment.

It is also obvious that the sensor electronics for these lamps can be refitted from the interior of the motor vehicle without any significant mounting effort. When a motor vehicle is delivered with a blind plug 4 in the area of the rear light, a retailer or workshop can easily install the capacitive sensor by removing the plug and inserting the respective sensor. For this purpose, the wiring harness of the motor vehicle can provide at the rear end respective connection possibilities to allow for a connection with the control system of the motor vehicle.

The invention claimed is:

1. A rear light module for a motor vehicle, comprises a housing, which has a connecting side facing toward the interior of the motor vehicle and an emission side facing toward the exterior of the motor vehicle,
   wherein the housing comprises multiple mountings at the connecting side, the multiple mountings providing feed-through openings and mechanical coupling means, which are designed for implementing and mechanically supporting lamps mounted to sockets, wherein the lamps with their sockets are arranged in respective mountings for forming a connection from the connecting side, extending into the housing and during periods of operation emitting their light through the emission side,
   wherein
   besides the mountings for the lamps mounted to sockets, at least one additional mounting is designed, the at least one additional mounting providing a feed-through opening and mechanical coupling means, in which a removable proximity sensor is selectively insertable, so that the proximity sensor can be connected from the connecting side and extends into the housing and detects when a user approaches the emission side.

2. A rear light module according to claim 1, wherein the proximity sensor comprises a capacitive sensor.

3. A rear light module according to claim 1, wherein the proximity sensor comprises an optical sensor.

4. A rear light module according to claim 2, wherein the capacitive proximity sensor comprises a circuit and a conductor loop coupled with the circuit.

5. A rear light module according to claim 1, wherein the socket of the proximity sensor with its mechanical coupling components is designed and formed similar to at least one of the sockets of the lamps, wherein the mounting for the at least one of the lamps and socket of the proximity sensor are designed and formed in a similar manner.

6. A rear light module according to claim 2, wherein the socket of the proximity sensor with its mechanical coupling components is designed and formed similar to at least one of the sockets of the lamps, wherein the mounting for the at least one of the lamps and socket of the proximity sensor are designed and formed in a similar manner.

7. A rear light module according to claim 3, wherein the socket of the proximity sensor with its mechanical coupling components is designed and formed similar to at least one of the sockets of the lamps, wherein the mounting for the at least one of the lamps and socket of the proximity sensor are designed and formed in a similar manner.

8. A rear light module according to claim 4, wherein the socket of the proximity sensor with its mechanical coupling components is designed and formed similar to at least one of the sockets of the lamps, wherein the mounting for the at least one of the lamps and socket of the proximity sensor are designed and formed in a similar manner.

9. A rear light module for a motor vehicle, comprises a housing, which has a connecting side facing toward the interior of the motor vehicle and an emission side facing toward the exterior of the motor vehicle,
   wherein the housing comprises multiple mountings at the connecting side, which are designed for implementing and mechanically supporting lamps mounted to sockets, wherein the lamps with their sockets are arranged in respective mountings for forming a connection from the connecting side, extending into the housing and during periods of operation emitting their light through the emission side, wherein besides the mountings for the lamps mounted to sockets, at least one additional mounting is designed, in which a removable proximity sensor is selectively insertable, so that the proximity sensor can be connected from the connecting side and extends into the housing and detects when a user approaches the emission side, and wherein the socket of the proximity sensor with its mechanical coupling components is designed and formed similar to at least one of the sockets of the lamps, wherein the mounting for the at least one of the lamps and socket of the proximity sensor are designed and formed in a similar manner.

10. A rear light module according to claim 9, wherein the proximity sensor comprises a capacitive sensor.

11. A rear light module according to claim 10, wherein the capacitive proximity sensor comprises a circuit and a conductor loop coupled with the circuit.

12. A rear light module according to claim 9, wherein the proximity sensor comprises an optical sensor.

* * * * *